United States Patent
Abe et al.

(10) Patent No.: US 9,263,089 B2
(45) Date of Patent: Feb. 16, 2016

(54) EDITING APPARATUS, EDITING METHOD, AND EDITING PROGRAM

(75) Inventors: Koichi Abe, Tokyo (JP); Shogo Tsubouchi, Tokyo (JP); Yasushi Okamoto, Tokyo (JP); Toru Ikeuchi, Tokyo (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 333 days.

(21) Appl. No.: 12/734,627

(22) PCT Filed: Nov. 18, 2008

(86) PCT No.: PCT/JP2008/003364
§ 371 (c)(1),
(2), (4) Date: May 13, 2010

(87) PCT Pub. No.: WO2009/066441
PCT Pub. Date: May 28, 2009

(65) Prior Publication Data
US 2010/0310231 A1     Dec. 9, 2010

(30) Foreign Application Priority Data
Nov. 19, 2007 (JP) .................... 2007-299135

(51) Int. Cl.
*H04N 5/93* (2006.01)
*H04N 5/783* (2006.01)
*G11B 27/034* (2006.01)
*G11B 27/00* (2006.01)

(52) U.S. Cl.
CPC ............ *G11B 27/034* (2013.01); *G11B 27/005* (2013.01); *H04N 5/783* (2013.01)

(58) Field of Classification Search
None
See application file for complete search history.

(56) References Cited

U.S. PATENT DOCUMENTS

| | | | |
|---|---|---|---|
| 5,760,767 A | 6/1998 | Shore et al. | |
| 6,415,095 B1* | 7/2002 | Morishima et al. | 386/281 |
| 8,189,994 B2* | 5/2012 | Inatomi et al. | 386/248 |
| 2003/0012551 A1* | 1/2003 | Nakayama et al. | 386/52 |
| 2005/0060755 A1 | 3/2005 | Daniels | |
| 2005/0117878 A1* | 6/2005 | Murata et al. | 386/52 |

(Continued)

FOREIGN PATENT DOCUMENTS

| | | |
|---|---|---|
| EP | 1626408 | 2/2006 |
| JP | 9107517 | 4/1998 |
| JP | 10174043 | 6/1998 |

(Continued)

OTHER PUBLICATIONS

Panasonic:"Panasonic AJ-D750P Operating Instructions," Internet Citation, http://tv.manualsonline.com/manials/mfg/panasonic/digital_video_casse, Apr. 23, 2004, pp. 1-71.

(Continued)

*Primary Examiner* — Heather Jones
(74) *Attorney, Agent, or Firm* — Arent Fox LLP

(57) ABSTRACT

Herein disclosed are an editing apparatus, an editing method, and an editing program allowing quick editing of video data. In order to clip a section in the video data and play it to be broadcasted as a replay, receiving a request to start playback from a desired position, an in-point is set in response to the request, and an out-point is set in response to a request to finish playback. Then, other video data from the video data of a section between the in-point and the out-point is generated.

10 Claims, 9 Drawing Sheets

(56) References Cited

U.S. PATENT DOCUMENTS

2009/0202218 A1 8/2009 Inatomi et al.
2010/0310231 A1 12/2010 Abe et al.

FOREIGN PATENT DOCUMENTS

| JP | 2001143447 A | | 5/2001 | |
|---|---|---|---|---|
| JP | 2007295138 A | * | 11/2007 | ............... H04N 5/91 |
| WO | 2007125882 A1 | | 11/2007 | |

OTHER PUBLICATIONS

Pansonic AJ-D750P with SDI and low hours for Sale, Internet Citation, http://forums.digitalmedianet.com/cgibin/displaywwugpos.fcgi?forum=avid_profesioal&post=040323051200, Apr. 23, 2004.
Search Report dated Mar. 30, 2009.
English Translation of First Office Action regarding Chinese Patent Application No. CN200880011 6658.1.
English Translation of Second Office Action regarding Chinese Patent Application No. CN2008800116658.1.
European Patent Office Communication dated Jan. 3, 2012 regarding Patent Application No. EP08851128.2.
IPRP dated May 25, 2010 with Written Opinion regarding PCT Application No. PCT/JP2008/0033664.
Notice of Reasons for Rejection dated Jan. 29, 2013 regarding Japanese Patent Application No. JP2010-533731.
EP Communication dated Jan. 16, 2015, regarding EP08851128.2.

* cited by examiner

EDITING APPARATUS, EDITING METHOD, AND EDITING PROGRAM

This application claims the benefit, under 35 U.S.C. §365 of International Application PCT/JP2008/003364, filed Nov. 18, 2008, which was published in accordance with PCT Article 21(2) on May 28, 2009 in English and which claims the benefit of Japanese patent application No. 2007-299135, filed Nov. 19, 2007.

TECHNICAL FIELD

The present invention relates to an editing apparatus, an editing method, and an editing program, and more particularly, to an editing apparatus, an editing method, and an editing program for editing material requiring quick editing, such as a live sport telecast, for example.

BACKGROUND ART

In recent years, nonlinear video editing apparatuses have become increasingly popular due to an improvement in processing speed of CPUs, an increase in speed and capacity of hard disk drives (HDDs), as well as an improvement in data compression coding technology. A nonlinear video editing apparatus digitizes, encodes and stores a video from a camera, a video tape recorder or the like, as video data in an HDD.

With the nonlinear video editing apparatus, the video data is edited in such a manner that the encoded video stored in the HDD is read, decoded and played back, and an operator edits the video data while watching the video on a monitor. For example, video data to be edited is played back, and the operator sets a starting position (in-point) and an ending position (out-point) of a scene to be clipped in the video data while watching the video that is being played. The in-point and the out-point are associated with the video data and stored as editing information, and a clip of the clipped scenes is generated based on this information (see Japanese Unexamined Patent Application Publication No. H09-233430, for example).

With the above nonlinear video editing, it is not necessary to actually copy or cut original video data to generate a clip. When playing a clip, specifying the clip causes video data from the in-point to the out-point to be decoded and played back, referring to the editing information.

DISCLOSURE OF INVENTION

Technical Problem

Nonlinear video editing apparatuses are used in news telecasts, live sport telecasts and the like. In such applications, it is often the case that some video data that has just been recorded or that is still being recording immediately goes on the air. Examples of this include replays of goal scenes during a live telecast of a soccer game.

In this case, if editing takes too long, viewers may become less focused on the scenes to be replayed, and when a new event that is interesting to the viewers happens, the viewers will pay attention to the new event. This makes it difficult to provide an attractive live telecast.

Further, in many cases replay scenes are used again in later broadcasting. A problem is noted in this case that it takes time to watch the video data again and clip a scene to be used.

In light of the abovementioned problems, it is an object of the present invention to provide an editing apparatus, an editing method and an editing program that are novel and convenient, eliminating the above noted problems. A specific object of the present invention is to provide an editing apparatus, an editing method and an editing program allowing quick editing of video data.

Technical Solution

In accordance with one aspect of the present invention, there is provided an editing apparatus, comprising: playback means for playing back video data; first setting means for setting a first reference point, in response to a request to start playback of the video data, at a position in the video data that is being played when the request is made; second setting means for setting a second reference point, in response to a request to finish playback of the video data, at a position in the video data that is being played when the request is made; and generating means for generating other video data from the video data of a section between the first reference point and the second reference point.

According to the present invention, the first reference point and the second reference point are set in response to the requests to start and finish playback of the video, respectively, and other video data with the first reference point as a starting point and the second reference point as an ending point is generated. Therefore, the operator does not have to set the first reference point and the second reference point separately, thus allowing quick playback, and generation of other video data clipped from the original video data at the same time as the playback, is possible. Further, the other video data that is generated need not be clipped from the original video data again for later broadcasting, thus saving time for editing.

It should be noted that the starting point and ending point of video data (i.e. clip) are respectively referred to as an in-point and an out-point in the claims and specification of the present application. Further, the video data may or may not contain audio data, and may be either analog or digital.

In accordance with another aspect of the present invention, there is provided an editing method comprising the steps of: setting, in response to a request to start playback of video data, a first reference point at a position in the video data at which the playback starts; playing back, in response to the request to start playback, the video data; setting, in response to a request to finish playback of the video data, a second reference point at a position on the video data that is being replayed when the request is made; and generating other video data from the video data of a section between the first reference point and the second reference point.

According to the present invention, it is possible to realize the same effects as the invention of the editing apparatus described above.

Advantageous Effects

According to the present invention, an editing apparatus, an editing method, and an editing program allowing quick editing of video data can be provided.

Figure 1:
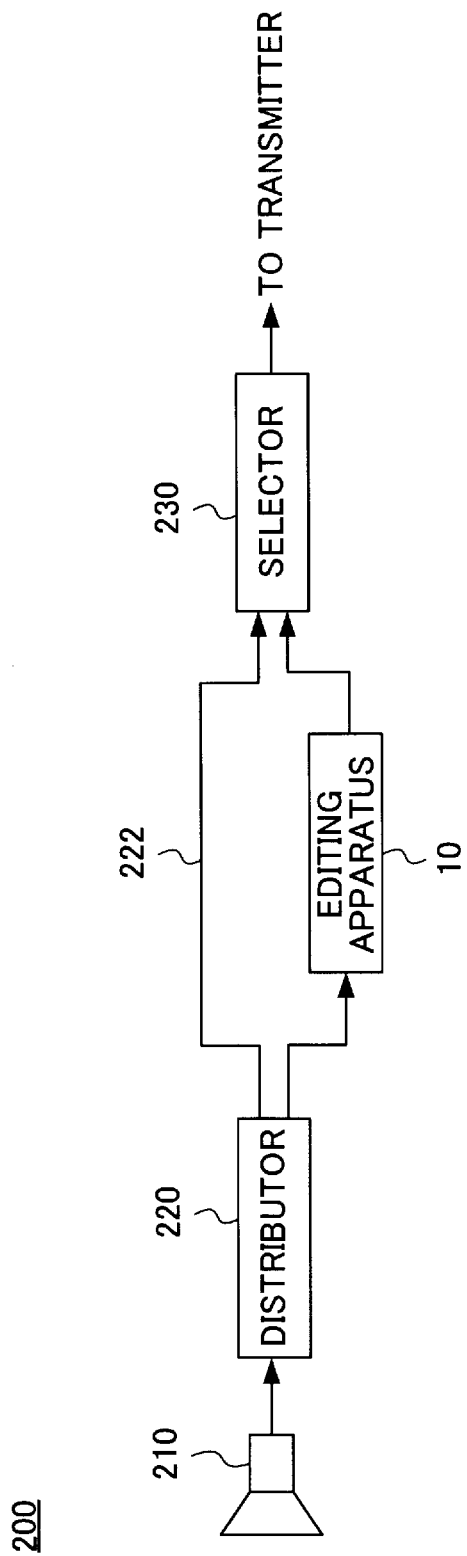
FIG. 1 is a block diagram illustrating a configuration of a live telecasting system including an embodiment of an editing apparatus according to the present invention.

EXPLANATION OF REFERENCE 10, 100 Editing apparatus
20 Editing apparatus main body
26 CPU
40, 110 Editing controller
41 Jog dial
42 Replay control lever
43a Replay key
43b Stop key
44a Out-point set key
44b In-point set key
44c Playback mode switching key
71 Playback unit
72 In-point setting unit
73 Out-point setting unit
74 Clip generating unit
75 Temporary in-point setting unit
76 Temporary out-point setting unit
77 In-point setting unit
78 Out-point setting unit
79 Accepting unit
80 Video data
82, 84 Clip

BEST MODE FOR CARRYING OUT THE INVENTION

The following describes embodiments according to the present invention with reference to the drawings.

First Embodiment

FIG. 1 is a block diagram illustrating a configuration of a live telecasting system including an embodiment of an editing apparatus according to the present invention. Referring to FIG. 1, a live telecasting system 200 is provided with a camera 210 that takes an image of, for example, an event such as a soccer game or of an on-site report, a distributor 220 that distributes video data taken by the camera 210, an editing apparatus 10 that edits the video data supplied from the distributor 220, a selector 230 that selects one of the video data supplied from the editing apparatus 10 and the video data supplied from the distributor 220 via a path 222 to pass a transmitter (not shown) for broadcasting.

The live telecasting system 200 passes the video data from the camera 210 to the transmitter via the path 222 and the selector 230. The live telecasting system 200, on one hand, stores the video data in a storage unit of the editing apparatus 10 (reference numeral "23" shown in FIG. 2), and reads the stored video data so that an operator can carry out preview playback and editing by means of a monitor (reference numeral "60" shown in FIG. 2) (this mode is referred to as "simulated live mode"). Further, the live telecasting system 200 clips a video clip of a goal scene in a soccer game or the like from the video data stored in the storage unit by the editing apparatus 10, and plays and passes the clip to the transmitter (not shown) via the selector 230.

Figure 2:
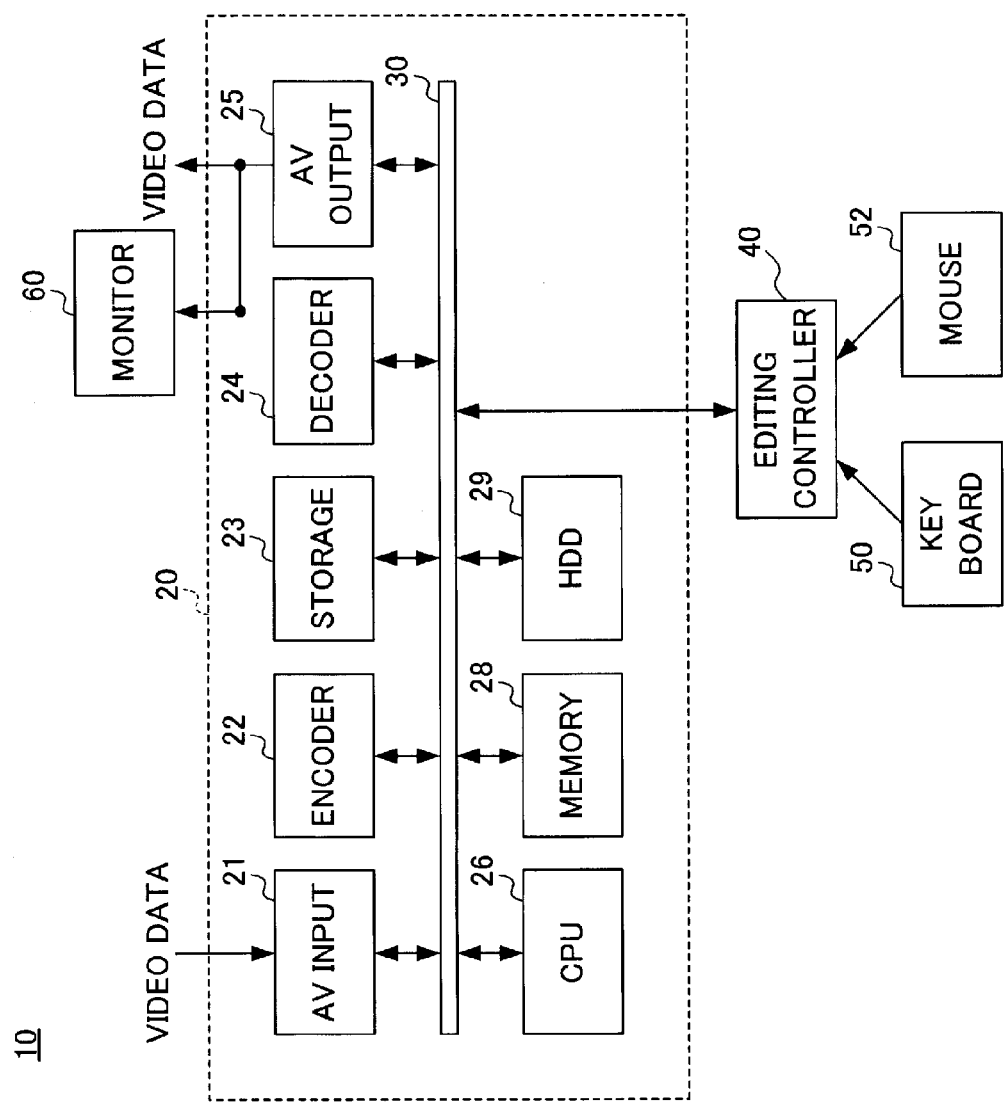
FIG. 2 is a block diagram illustrating a configuration of a first embodiment of the editing apparatus according to the present invention.

FIG. 2 is a block diagram illustrating a configuration of the embodiment of the editing apparatus according to the present invention. Referring to FIG. 2, the editing apparatus 10 is provided with an editing apparatus main body 20, an editing controller 40, a keyboard 50, a mouse 52, and a monitor 60. The editing apparatus main body 20 is provided with an AV input 21, an encoder 22, a storage unit 23, a decoder 24, an AV output 25, a CPU (central processing unit) 26, a memory 28, an HDD 29, and a bus 30 to which these components are connected.

Further, each of the editing controller 40 and the monitor 60 are connected to the bus 30 via an interface, and each of the keyboard 50 and the mouse 52 are connected to the editing controller 40 via an interface. It should be noted that these interfaces are not shown in FIG. 2 for convenience of explanation.

The AV input 21 is connected to a camera, hard disk in which material data are stored, or a video tape recorder. Video data to be edited are inputted to the AV input 21. The video data may or may not include video data with or without audio data or other data, or may include only audio data. In either case, the editing method according to the present invention works in the same manner, and the following description is based on the video data for convenience of explanation. Providing a single AV input 21 is sufficient, but more than one AV input 21 may be provided.

Further, the AV input 21 may be supplied with analog or digital video data. The AV input 21 digitizes the video data by means of an analog-to-digital converter if the data is analog. The video data is encoded by the encoder 22 that is described later, and stored in the storage unit 23.

It should be noted that, when the data is unencoded and uncompressed, the video data may be stored in the storage unit 23 without going through the encoder 22 after the AV input 21. This is advantageous because in editing it is not necessary to decode the video data by the decoder 24 before displaying or playing back the video data.

The encoder 22 encodes the video data, and supplies the encoded video data to the storage unit 23 via the bus 30. Examples of the encoding method include the DV codec for generating intra-frame coded data and MPEG, H.264/AVC system, DVC, DVCPRO, DVCPROHD, JPEG, and JPEG 2000, for generating inter-frame predictive coded data. It should be noted that the encoding process carried out by the encoder 22 may also be realized by software. Providing a single encoder 22 is sufficient, but more than one encoder 22 may be provided.

The storage unit 23 stores video data supplied from the AV input 21 and the encoder 22, video data that has been edited in the encoding process, and editing information including information relating to the editing process. Further, the storage unit 23 reads the data in response to a request. The storage unit 23 may be any device that is capable of storing data, such as a hard disk drive (HDD), a semiconductor memory, a magnetic tape drive, or an optical disk drive. The storage unit 23 may be provided within and/or externally to the editing apparatus main body 20.

The decoder 24 decodes the encoded video data, and supplies the decoded video data to the AV output 25 via the bus 30. Providing a single decoder 24 is sufficient, but more than one decoder 24 may be provided. It should be noted that the decoding process carried out by the decoder 24 may also be realized by software, and the decoding process can be carried out by a program using the CPU 26.

The AV output 25 is connected with the selector 230 and additionally to the transmitter and a network, and outputs the decoded video data using the decoder 24. The video data outputted from the AV output 25 includes video data that have been edited, video data that have been inputted into the AV input 21, and video data that have been read from the storage unit 23. It should be noted that the AV output 25 may output the encoded video data without decoding.

Further, the AV output 25 is connected with the monitor 60, which displays the decoded video data. Providing a single AV output 25 is sufficient, but more than one AV output 25 may be provided.

It should be noted that the AV output 25 can be connected to any device that transmits or receives video data, and is not limited to the selector 230. Further, the AV output 25 may be provided with a digital-to-analog converter, by which digital video data is converted into an analog video signal.

The CPU 26 executes, for example, a control program stored in a nonvolatile memory (ROM) of the memory 28 to control an entire operation of the editing apparatus 10.

It should be noted that the memory 28 is not limited to a ROM, and may be a random access memory (RAM), or may include both of these. As described herein, the memory 28 includes both a ROM and a RAM.

It should be noted that the program executed by the CPU 26 may be stored in the ROM or the RAM, and further, may be stored in the hard disk device (HDD) 29. While the memory 28 is connected to the bus 30, the memory 28 may be provided within the CPU 26. Further, the program run in the CPU 26 may be stored in the storage unit 23, instead of the HDD 29. In this case, the HDD 29 can be omitted.

Figure 3:
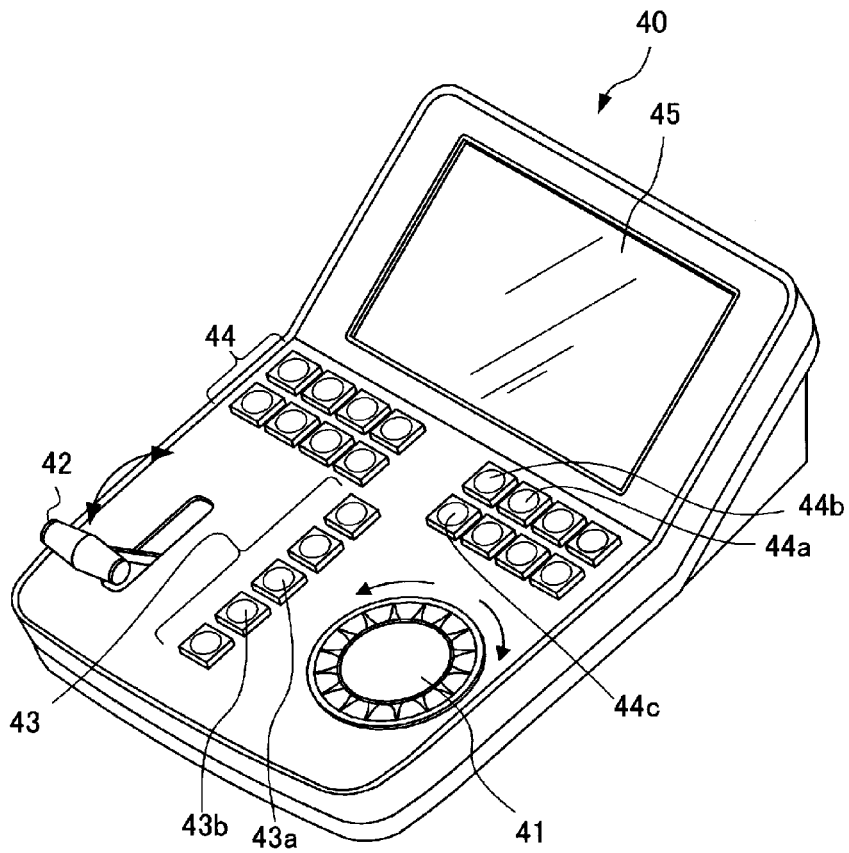
FIG. 3 is a perspective view of an editing controller.

FIG. 3 is a perspective view of the editing controller. Referring to FIG. 3 together with 2, the editing controller 40 is provided with a jog dial 41 is provided in a lower right portion of the controller. The jog dial 41 determines a speed for playing the video data, according to a rotation speed of the jog dial, and rotating the jog dial 41 faster increases the playback speed, and stopping the rotation stops the playback. Further, if the jog dial 41 is rotated in the clockwise direction, playback is in the forward direction, and if the jog dial 41 is rotated in the counterclockwise direction, playback is in the backward direction. Generally, the operator manipulates the jog dial 41 while watching the video data that is being replayed on the monitor 60.

Further, the editing controller 40 is provided with a replay control lever 42 in a lower left portion of the controller. The replay control lever 42 determines the playback speed of the video data according to an angle of the lever that is pushed upward as viewed in the drawing. When the upward pushing angle is 0 (0% speed), the playback is stopped, and pushing the lever to increase the angle increases the playback speed. When the upward pushing angle is at its maximum level, the playback speed is normal (100% speed). When playing the video data, for example, the replay control lever 42 is pushed to make the angle at the maximum level.

The editing controller 40 is provided with a group of keys 43 in a lower central portion of the controller, where a play key 43a, a stop key 43b, or the like are arranged. Replaying the video data at normal speed is started by the operator pressing down the play key 43a. Replaying the video data is stopped by pressing down the stop key 43b.

The editing controller 40 is provided with a group of keys 44 in a central portion of the controller, with a switching key when there is more than one AV input 21, an out-point set key 44a that will be described later, an in-point set key 44b, and a playback mode switching key 44c to switch between a preview playback mode and a transmission playback mode are arranged.

The editing controller 40 is provided with a sub-monitor 45 in an upper portion of the controller. The sub-monitor 45 displays various editing information such as information on a clip and a playlist, as well as setting of the editing apparatus 10. Further, as the sub-monitor 45 is a touch panel, various operations are possible by touching the panel according to the display on the panel. A screen of the sub-monitor 45 will be described later.

Further, an operation of the editing apparatus 10 by manipulating the editing controller 40 is carried out by the CPU 26, other components that constitute the editing apparatus 10, and the program stored in such as the memory 28 and the HDD 29, working in cooperation.

It should be noted that the editing controller 40 may be provided with a CPU (not shown) that controls the display on the sub-monitor 45 and various types of operation of the editing controller 40, may also be provided with a memory (not shown) that stores setting data of the in-point and the out-point. Providing the CPU and the memory for the editing controller 40, it is possible to reduce the load of the CPU 26 and the memory 28 of the editing apparatus main body.

Functional Configuration of the Editing Apparatus

Figure 4:
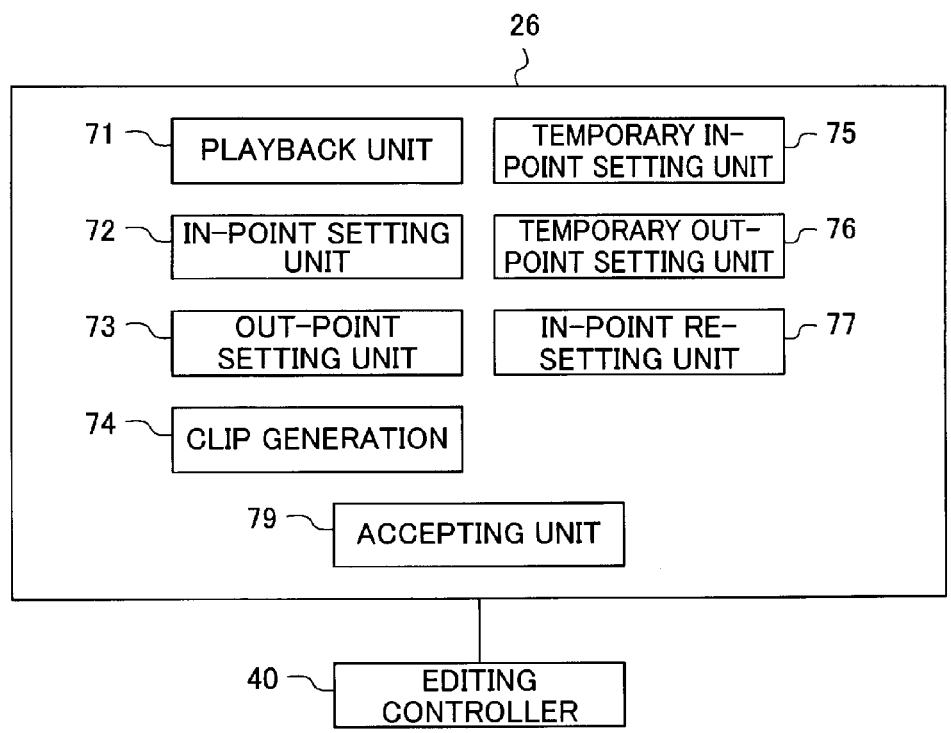
FIG. 4 is a functional configuration diagram of the first embodiment of the editing apparatus according to the present invention.

FIG. 4 is a functional configuration diagram of an embodiment of the editing apparatus according to the present invention. Referring to FIGS. 1 to 4, the CPU 26 of the editing apparatus 10 is provided with a playback unit 71, an in-point setting unit 72, an out-point setting unit 73, a clip generating unit 74, a temporary in-point setting unit 75, a temporary out-point setting unit 76, an in-point resetting unit 77, and an accepting unit 79, which work in cooperation with the program. With these components, the CPU 26 realizes functions of (1) storing and playing of the video data, (2) playback-editing of the video data, and (3) generating a clip. Next, each function of the editing apparatus 10 is described.

(1) Function of Storing and Replaying the Video Data

The CPU 26, for example, supplies video data taken by the camera 210 to the AV input 21 of the editing apparatus 10, encodes the supplied video data using the encoder 22, and stores the encoded video data in the storage unit 23. Further, the CPU 26 reads the stored video data from the storage unit 23 using the playback unit 71, decodes the read video data using the decoder 24, outputs the decoded video data from the AV output 25 to the selector 230, and displays the outputted video data on the monitor 60.

(2) Function of Playback-Editing of the Video Data

The CPU 26 reads management data of a file stored in the storage unit 23, and accepts selection of the file. The CPU 26 accepts a request to start playback from the editing controller 40 using the accepting unit 79, reads the video data of the selected file from the storage unit 23 using the playback unit 71 in response to the request, and decodes the read video data using the decoder 24.

The CPU 26 supplies the decoded video data from the AV output 25 to the monitor 60, thereby displaying the image of the video. At the same time, the CPU 26 sends out the decoded video data from the AV output 25 via the selector 230.

It should be noted that starting the playback of the video data is requested by pushing up the replay control lever 42 of the editing controller 40, and starting the playback at a normal speed is requested by pushing up the replay control lever 42 to a position at which the angle is at the maximum level. Further, starting the playback of the video data at a normal speed is also requested by pressing down the play key 43a.

Further, when finishing the playback, the CPU 26 accepts a request for finishing playback from the editing controller 40 by the accepting unit 79, and in response to the request, stops reading the video data from the storage unit 23. Finishing the playback of the video data is requested by pressing down the stop key 43b of the editing controller 40.

Moreover, the CPU 26 accepts a request for a trick play (variable speed playback), fast-forward, or reverse playing, from the editing controller 40 using the accepting unit 79, and carries out variable speed playback, fast-forward, or reverse playing of the video data from the storage unit 23, in response to the request, using the playback unit 71.

(3) Function of Generating a Clip

The CPU 26 accepts the request to start playback of the video data using the accepting unit 79, and sets an in-point at a position in the video data when the starting of the playback is requested, in response to the request, using the in-point setting unit 72. The position of the in-point is specified, for example, based on a time code and stored in the memory 28.

Further, the CPU 26 accepts the request to stop the playback of the video data using the accepting unit 79, and sets an out-point at a position on the video data when the stopping of the playback is requested, in response to the request, using the out-point setting unit 73. The position of the out-point is specified, for example, based on the time code and stored in the memory 28. It should be noted that, when the out-point is set using the out-point setting unit 73, the CPU 26 deletes a temporary out-point from the memory 28.

The CPU 26 carries out preview playback of the video data before playing the video data, and further, when performing reverse playback, accepts a request for reverse playback using the accepting unit 79, and sets a temporary out-point at a position on the video data when the reverse playback is requested in response to the request, using the temporary out-point setting unit 76. The position of the temporary out-point is specified based on the time code. The position of the temporary out-point is stored in the memory 28.

It should be noted that, when the CPU 26 accepts a request for converting the temporary out-point using the accepting unit 79 before the temporary out-point is deleted from the memory, the CPU 26 converts the temporary out-point to the out-point using an out-point converting unit 78, in response to the request, to set the out-point at the temporary out-point.

Moreover, the CPU 26, using the clip generating unit 74, reads information of the in-point and the out-point from the memory 28, and associates the in-point and the out-point with the video data, thereby generating a clip of video data of a section between the in-point and the out-point. In other words, the clip is a unit of the video data virtually formed by the video data, the in-point and the out-point. The information of the clip is displayed on the monitor 60, or on the sub-monitor 45 of the editing controller 40, as described later.

It should be noted that the in-point resetting unit 77 shown in FIG. 4 is not essential to the first embodiment, but essential to a second embodiment.

Figure 5:
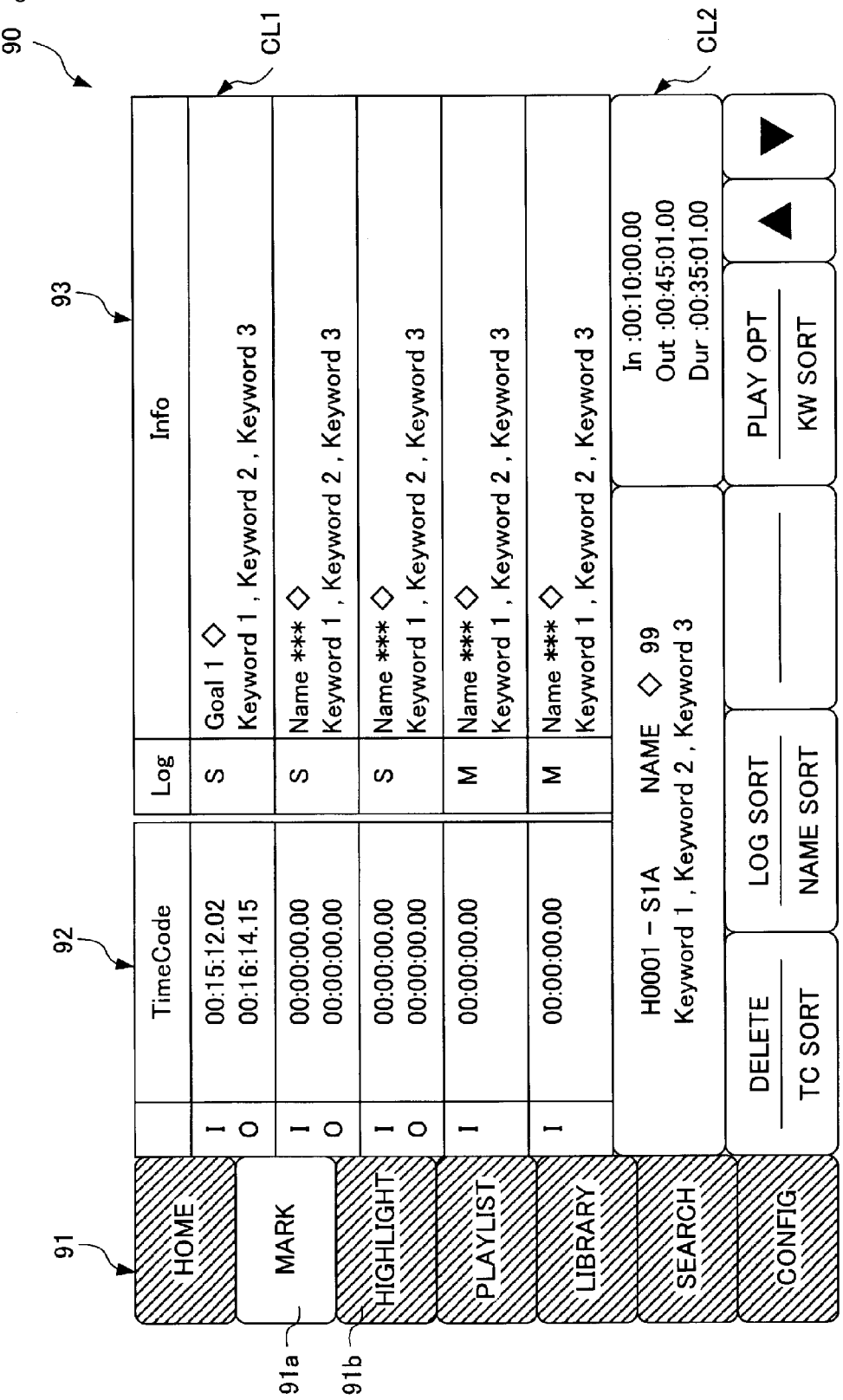
FIG. 5 shows an example of a screen displayed on a sub-monitor of the editing controller.

FIG. 5 shows an example of a screen displayed on the sub-monitor of the editing controller. Referring to FIG. 5, various types of information are displayed on a screen 90 by touching command buttons 91 that are arranged vertically on the left side and allow various editing operations.

For example, in FIG. 5, a "Mark" 91a is selected, and information of the clip and information of time mark are displayed on the right side of the command buttons 91. It should be noted that it is possible to set a temporary in-point and a temporary out-point as the in-point and the out-point, respectively, by an input operation of touching a "HIGH-LIGHT" 91b.

Once the clip is generated, a time code for the in-point (indicated by "I") and a time code for the out-point (indicated "O") are displayed in a column 92 of time codes ("Time-Code") as time information for the clip. The time codes are specified for each frame of the clip, and represent the time when the video data is taken and the number of frames. The time code is expressed in a format "hh:mm:ss.ff". In this format, "hh" represents hours, "mm" represents minutes, "ss" represents seconds, and "ff" represents frames. Approximately 30 frames correspond to one second. For example, in a clip CL1, the time code for the in-point is "00:15:12.02", and the time code for the out-point is "00:16:14.15". This indicates that the clip is for video data with the in-point being 15 minutes 12 seconds and 02 frames and the out-point being 16 minutes 14 seconds 15 frames. It should be noted that the time codes are based on the time at which the video data has originally been taken. It should be noted that the editing apparatus is capable of changing the number of frames per second according to the standard to be used.

Moreover, a clip name and keywords are displayed in a column 93 of information ("info") as additional information of the clip. For example, the name of the clip is "Goal1" in the case of the clip CL1. The name and the keywords of the clip may be inputted, for example, via the keyboard that is displayed as a pop-up in this screen. The name of the clip is used as a part of a file name along with a predetermined extension when storing the clip in the storage unit 23 as an independent video.

The operator may check the generated clip in the screen 90. Moreover, it is possible to play the clip by selecting the clip by touching a displayed part of the clip and manipulating the editing controller 40, and further it is possible to pass out the clip from the AV output 25.

Further, information of a clip CL2 that is currently selected is displayed below the screen 90. In this example, the name of the clip is "HS0001-S1A", the in-point (or the temporary in-point) is 00:10:00.00, the out-point (or the temporary out-point) is 00:45:01.00, and duration (time length of the clip) is 00:35:01.00. Further, the information in the sub-monitor 45 may be displayed on the monitor 60. The clip CL2 shows status of a temporary clip or the clip.

Editing Method

Figure 6:
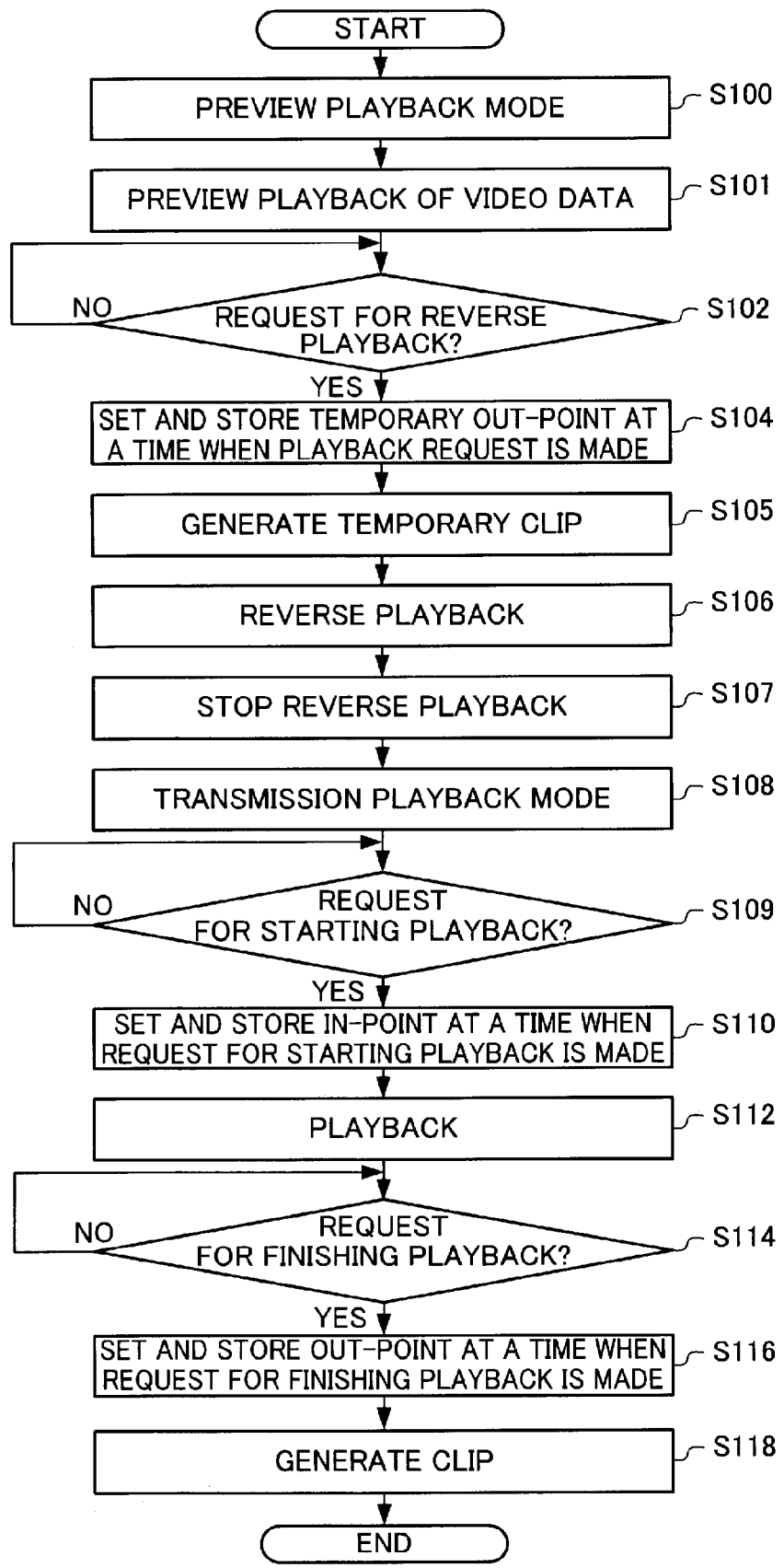
FIG. 6 is a flow chart illustrating a first embodiment of an editing method according to the present invention.
Figure 7:
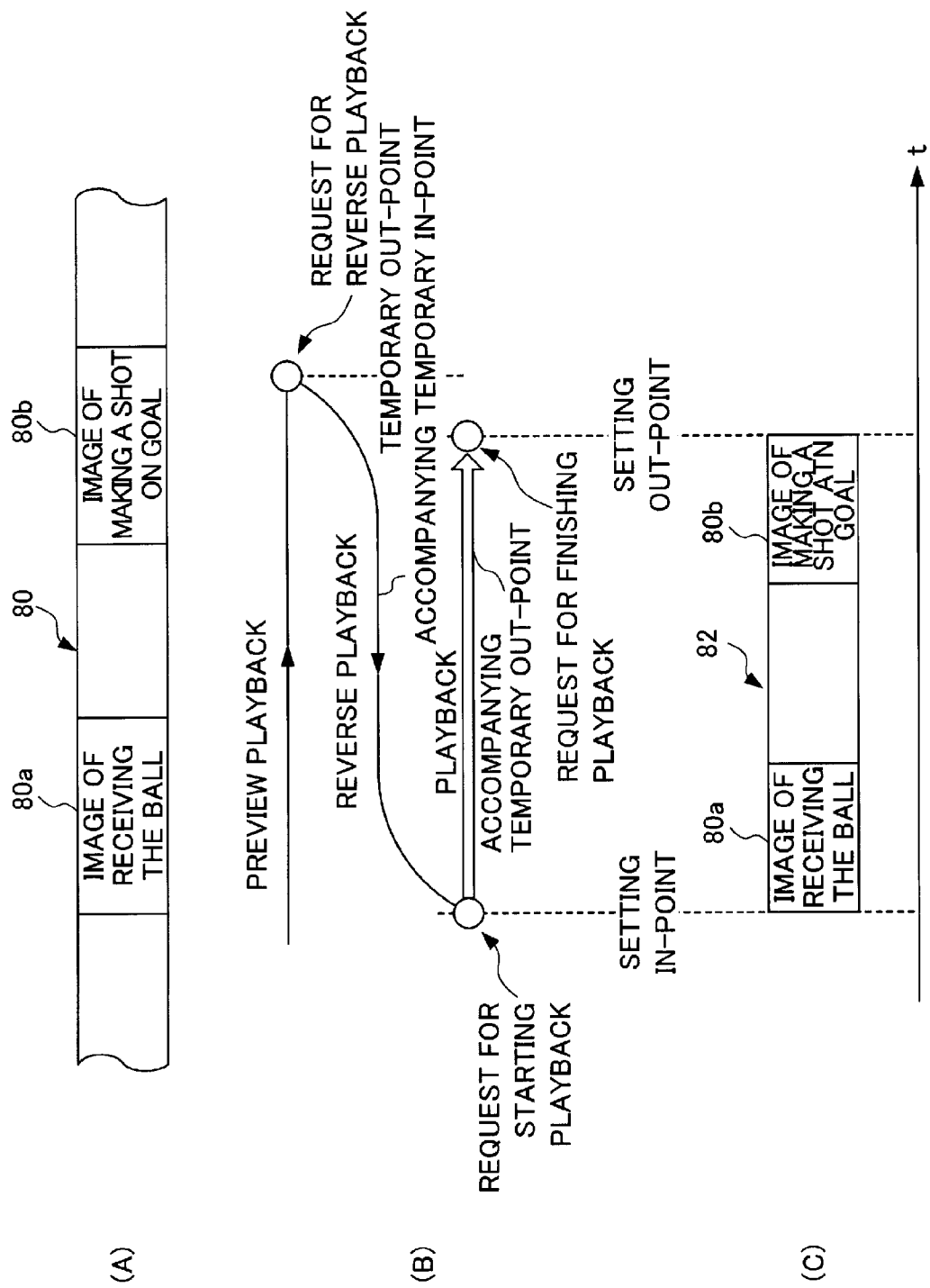
FIG. 7 is a flow chart illustrating how a clip is generated in the first embodiment of the editing method according to the present invention.

FIG. 6 is a flow chart illustrating the first embodiment of an editing method according to the present invention. FIG. 7 is a flow chart illustrating how the clip is generated in the first embodiment of the editing method according to the present invention. It should be noted that, (A) in FIG. 7 shows video data 80 along a time-line, (B) shows playback operation and how the temporary out-point, the in-point, the out-point and such are set, and (C) shows a clip 82 that is virtually clipped. A description will be given with reference to FIGS. 6 and 7, as well as FIGS. 1 to 5.

The following describes the first embodiment of the editing method according to the present invention taking an exemplary case in which the video data (clip) 82 is clipped out of the video data 80 containing a scene in which a player makes a shot at goal in a soccer game, from an image 80a of the player receiving the ball to an image 80b of the player making a shot at goal, referring to (A) in FIG. 7, and the edited video data 82 is sent out for broadcasting.

First, the operator manipulates the selector 230 shown in FIG. 1 to make a setting such that the video data on the path 222 is outputted. That is, the operator makes a setting such that the video data from the camera 210 is outputted to the transmitter.

Then, the operator makes a request to switch to the preview playback mode of the video data 80 stored in the storage unit 71. The request to switch to the preview playback mode is made, for example, by pressing down the playback mode switching key 44c on the editing controller 40. In response to the request, the CPU 26 switches to the preview playback mode (S100). It should be noted that, in the preview playback mode, the temporary in-point and the temporary out-point are set as described later.

Subsequently, a request to play the video data 80 is made (S101). The request to playback is made by the operator, for example, rotating the jog dial 41 in the clockwise direction. In response to the request, the CPU 26 makes the storage unit 23 start reading the video data 80, the decoder 24 decode the video data, and the monitor 60 display the image of the video data. The operator previews the video from the image 80a of the player receiving the ball to the image 80b of the player making a shot at goal displayed on the monitor (see (B) in FIG. 7).

Next, the operator checks images near the image 80b of the player making a shot at goal, and makes a request for reverse playback to the editing apparatus 10. The request for reverse playback is made, for example, by operator rotating the jog dial 41 of the editing controller 40 in the counterclockwise direction. The CPU 26 determines whether or not the request for reverse playback is made, and if the request for reverse playback has been made ("Yes" at Step S102), the CPU 26 makes, in response to the request, the storage unit 23 start reading the video data, the decoder 24 decode the read video data, and the monitor display the decoded image in reverse playback (see (B) in FIG. 7).

In response to the request for reverse playback, the CPU 26 sets the temporary out-point at a position on the video data when the request is made (S104). The temporary out-point is, for example, set based on the time code of the video data. Then, the CPU 26 stores the time code having the temporary out-point in the memory 28 as data of the temporary out-point. It should be noted that the time code having the temporary out-point is displayed in a portion indicated by "Out" of the clip CL2 shown in FIG. 5, in the screen of the sub-monitor 45 of the editing controller 40.

Further, in response to the request for reverse playback, the CPU 26 sets the temporary in-point at the same position as the temporary out-point, and generates a temporary clip of the video data of a section between the temporary in-point and the temporary out-point (S105). The temporary clip corresponds to the video data of a section between the temporary in-point and the temporary out-point out of the video data 80, and the section varies according to the movement of the temporary in-point and the temporary out-point. It should be noted that, at this time, the temporary in-point and the temporary out-point are both at the same video data, that is, at a position for an image of a single frame. It should be noted that the time code of the temporary in-point is displayed in a portion indicated by "In" of the clip CL2 shown in FIG. 5, in the screen of the sub-monitor 45 of the editing controller 40.

The CPU 26 replays the video data (S106) backward. The CPU 26 makes the temporary in-point accompany the video data that is being played in reverse. The temporary in-point is set, for example, based on the time code of the video data, and therefore the position of the temporary in-point is updated as the video data is played in reverse. The CPU 26 stores the time code in the memory 28 as data of the temporary in-point, and the data of the temporary in-point in the memory 28 is updated as the video data is played in reverse.

Next, the operator watches the images that are played in reverse, and determines a replay starting position, for example, the image 80a of the player receiving the ball from another player, that is to be broadcasted as a replay, and makes a request to stop the editing apparatus 10 (S107). The request to stop is made, for example, by the operator stopping rotation of the jog dial 41 (see (B) in FIG. 7). It should be noted that the temporary in-point accompanies the position of the video data that has been stopped.

It should be noted that the stopping position may be adjusted by playing forward or in reverse using the jog dial 41, after making the stopping request. With this, it is possible to adjust the replay starting position, that is, the position of the temporary in-point (in-point), more accurately.

Next, the operator or a different operator, under an instruction by a program director, switches the selector 230 to the editing apparatus 10. In this way, the video data outputted from the editing apparatus 10 is transmitted via the selector 230.

Next, by a request for switching to the transmission playback mode, the CPU 26 switches to the transmission playback mode (S108). The request for selecting the transmission playback mode is made, for example, by the operator pressing down the playback mode select key 44c. In the transmission playback mode, the temporary in-point and the temporary out-point are respectively set as the in-point and the out-point.

Next, the operator makes a request for starting playback for transmission to the editing apparatus 10, so as to transmit the video data to be broadcasted as a replay. The CPU 26 determines whether or not the request for starting playback for transmission is made, and if the request for starting playback for transmission has been made, the CPU 26, in response to the request ("Yes" at Step S109), makes the storage unit 23 start reading the video data, the decoder 24 decode the read video data, and the AV output 25 transmit the decoded video data. The request for starting playback is made, for example, by the operator pushing up the replay control lever 42 or pressing down the play key 43a of the editing controller 40. In this way, the video data is transmitted from the editing apparatus 10 via the selector, that is, the video data is broadcasted.

Moreover, in response to the above request for starting playback, the CPU 26 sets the in-point at a position in the video data when the request is made (S110). That is, the temporary in-point that accompanies the reverse playback at S106 is positioned at a position on the video data when the request for playback is made, and therefore the in-point is set on the video data at which the temporary in-point is positioned. Similarly to the temporary in-point, the in-point is, for example, set based on the time code of the video data 80.

Then, the CPU 26 stores the time code in the memory 28 as data of the in-point. The data of the in-point is stored along with the previously set temporary out-point. It should be noted that the data may contain such as the name and keywords of the clip inputted by the operator, in addition to the time code of the in-point. By including the name of the clip, identifying the clip becomes easier when there is more than one clip (see (B) in FIG. 7). It should be noted that the time code of the in-point is displayed in the portion indicated by "In" of the clip CL2 shown in FIG. 5, in the sub-monitor 45 of the editing controller 40.

Moreover, the CPU 26 plays the video data (S112) and makes the temporary out-point accompany a playback position, changing the position of the temporary out-point to the playback position. This playback may include, in addition to playback at normal speed, variable speed playback, pausing playback, and reverse playback.

Next, the operator watches the images that are played, and makes a request to finish playback at the image 80*b* of the player making a shot at goal, to the editing apparatus 10. This request for finishing playback is a request asking for different processing from, for example, the request for stopping playback by pressing down the stop key 43*b* and a request for switching to preview playback. The request for switching to preview playback is made, for example, by pressing down the playback mode select key 44*c*.

The CPU 26 determines whether or not the request for finishing playback is made, and sets the out-point, in response to the request for finishing playback ("Yes" at Step S114), at a position on the video data when the request for finishing playback is made. That is, the out-point is set at the position on the video data at which the accompanying temporary out-point is positioned when the request for finishing playback is made. The out-point is set, for example, based on the time code of the video data. Then, the CPU 26 stores the time code in the memory 28 as data of the out-point. The data of the out-point is stored along with the previously set in-point (see (B) in FIG. 7).

It should be noted that the playback may be stopped by the operator pulling back the replay control lever 42 to the position at which the speed is 0% before making the request for finishing playback.

Next, the CPU 26 generates the clip 82 based on the setting of the in-point and the out-point (S118). Specifically, the CPU 26 registers the clip 82 as the video data 80 of a section between the in-point and the out-point by associating the setting data of the in-point and the out-point with the video data 80 (see (C) in FIG. 7). In other words, in this way, the temporary in-point and the temporary out-point are respectively decided as the in-point and the out-point, and the temporary clip is stored in the memory 28 as a clip. The clip 82 is displayed in a list of clips shown in the monitor 60 and the sub-monitor 45 of the editing controller 40. The clip is a unit of virtual video data generated by associating the original video data 80 and the setting data of the in-point and the out-point. The clip 82 may be transmitted through the AV output 25 from the editing apparatus 10 after being decoded by the decoder 24, and may be stored in the storage unit 23 as a different piece of video data from the original video data.

According to the first embodiment, the in-point is set on the video data automatically in response to the request for starting playback at S110, and consequently a conventionally performed operation for setting the in-point such as pressing down the in-point set key, for example, can be omitted. This allows quick operation.

Further, the out-point is set on the video data automatically in response to the request for stopping playback at S116, and consequently, operation conventionally performed by the operator for setting the out-point such as pressing down of the out-point set key, for example, can also be omitted. This allows even more quick operation. As described above, because the first embodiment allows quick operation, it is possible to quickly prepare a desired piece of video data, thereby allowing broadcasting in a timely manner.

Especially, according to the first embodiment, it is possible to concentrate on operation of editing and playing back without concern about generation of clips even when various events continuously occur during a live telecast of a soccer game, for example.

Further, the portion of the video data that is broadcasted as a replay during a live telecast is used in the closing of the same program or in a sports highlight show in many cases. According to the first embodiment, a clip of the portion of video data that has been broadcasted as a replay is automatically generated, and accordingly it is possible to use the clip without editing the video data again to generate a clip, when it is desired to use the portion at a later time.

Further, because the clip is automatically generated, the director of the program can see the list of the clips shown in FIG. 5, for example, when a program for broadcasting is made at a later time, and is informed of the presence of the clip. Consequently, it is possible to avoid failing to include the clip in the program. Further, it becomes easier for the operator to select the clips, for example, by seeing the list of clips shown in FIG. 5, when backing up the clips.

It should be noted that, while both of the in-point and the out-point are set automatically in the first embodiment as described above, only one of the in-point and the out-point may be set automatically, and the other may be set by a conventional operation such as pressing a key. Even in such a case, one of the in-point and the out-point is set automatically, thus allowing quick operation.

It should be noted that, while switching from the preview playback mode to the transmission playback mode at the above Step S108 is carried out by the operator pressing the playback mode select key 44*c* as one example, switching from the preview playback mode to the transmission playback mode may be automatically carried out by the operator pushing up the replay control lever 42 or pressing down of the play key 43*a* at Step S109. With this, the intentional selection of the transmission playback mode can be omitted, thus allowing quick operation. It should be noted that, in this case, the playback mode select key 44*c* is used to select the preview playback mode.

Second Embodiment

The second embodiment of the present invention is a modification of the first embodiment, in which resetting of the position of the in-point after setting the in-point is possible. The example described in the second embodiment has the same configuration as that shown in FIGS. 1 to 5, and the configuration shown in FIGS. 6 and 7 are substantially the same. Therefore, the editing method according to the second embodiment is described with reference to FIG. 6.

First, in the second embodiment of the editing method, Steps S100 to S110 shown in FIG. 6 are carried out in the same manner as described in the first embodiment.

Next, in the transmission playback mode, during playing the video data at S112, in response to a request for resetting the in-point by the operator, the CPU 26 resets the in-point at a position on the video data when the request is made using the in-point resetting unit 77 (shown in FIG. 4). The request for resetting the in-point is made, for example, by pressing the in-point set key 44*b* of the editing controller 40.

Next, Steps S114 to S118 shown in FIG. 6 are carried out in the same manner as described in the first embodiment.

In the second embodiment, it is possible to reset the in-point while watching the images subsequently played back, even in a case in which the in-point has been set upon starting playback in the transmission playback mode. This allows editing with higher flexibility, without impairing the effect of quick operation which is an advantage of the first embodiment. It should be noted that the second embodiment provides all the advantages that are described in the first embodiment.

Third Embodiment

Figure 8:
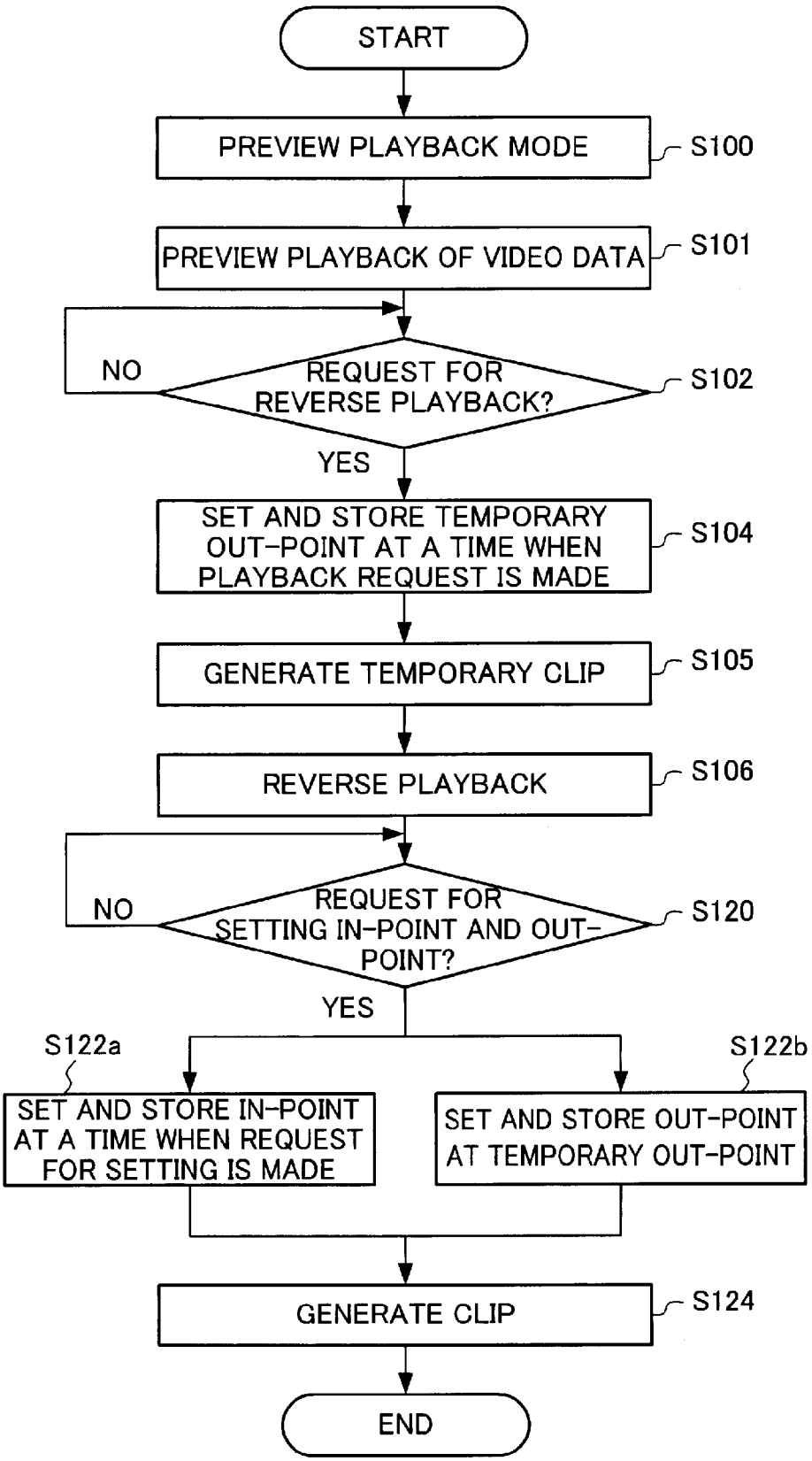
FIG. 8 is a flow chart illustrating a third embodiment of the editing method according to the present invention.
Figure 9:
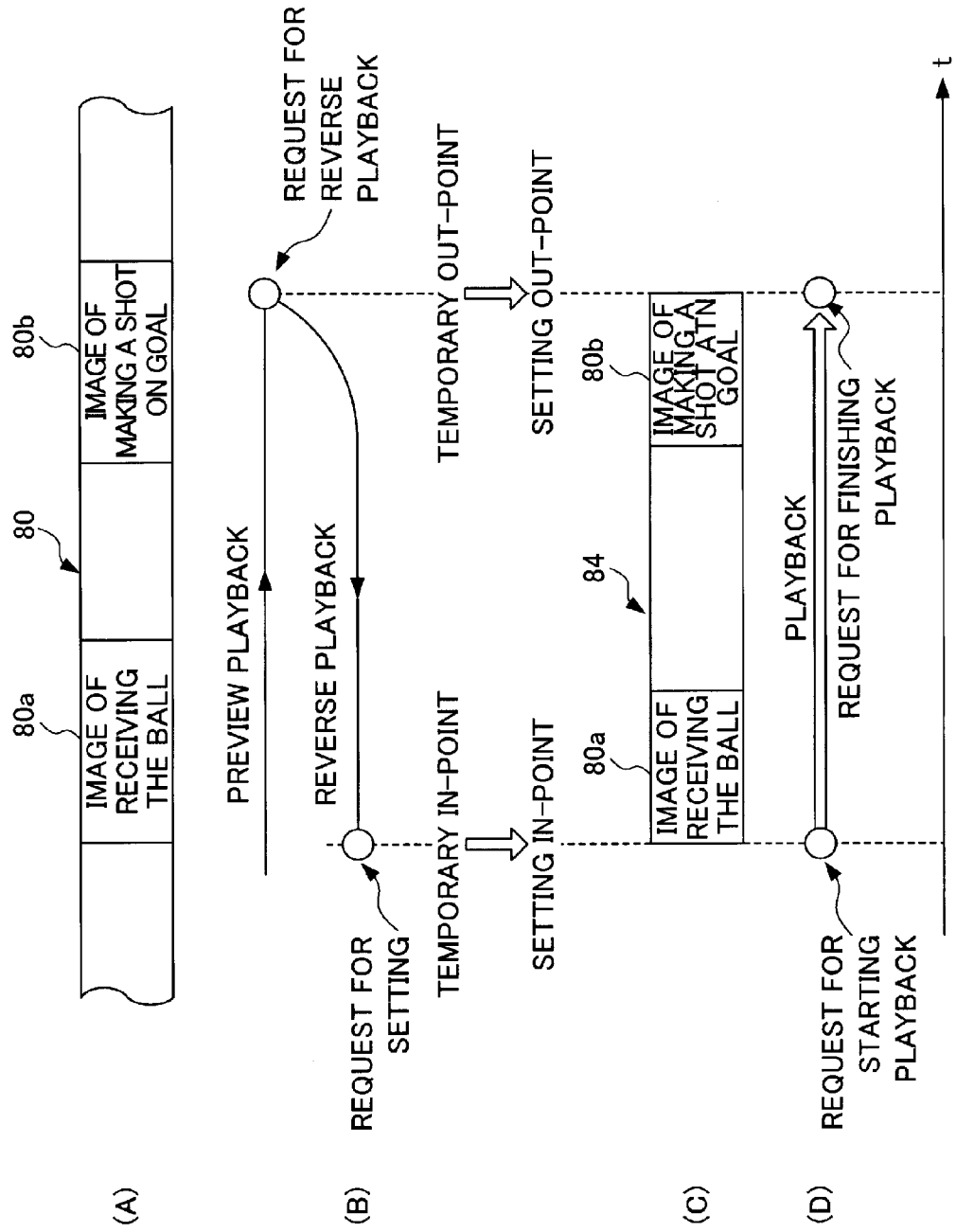
FIG. 9 is a diagram illustrating how the clip is generated in the editing method according to the present invention.

FIG. 8 is a flow chart illustrating a third embodiment of the editing method according to the present invention. FIG. 9 is a diagram illustrating how the clip is generated in the editing method according to the present invention. It should be noted that, (A) in FIG. 9 shows the video data 80 along a time-line, (B) shows how the edit operation and setting of the temporary out-point, the temporary in-point, the in-point, and the out-point are carried out, (C) shows a clip 84 that is virtually clipped, and (D) shows how the playback operation is carried out.

The third embodiment of the present invention is a modification of the first embodiment. The third embodiment describes an example in which the in-point and the out-point are set before playback in the transmission playback mode. Accordingly, the example described in the third embodiment has substantially the same configuration as that shown in FIGS. 1 to 5. The following describes the third embodiment with reference to FIGS. 8 and 9, in addition to FIGS. 1 to 5.

Steps S100 to S106 shown in FIG. 8 are carried out in the same manner as described in the first embodiment concerning Steps S100 to S106 shown in FIG. 6. It should be noted that, in the reverse playback at S106, the temporary out-point is set at S104, and the temporary in-point accompanies the video data that is being played reverse.

Next, the operator watches the images that are played in reverse playback (S106), and makes a request for setting the in-point and the out-point at the image 80a of the player receiving the ball from another player. The CPU 26 determines whether or not the request for setting the in-point and the out-point is made. If the request for setting the in-point and the out-point has been made, in response to the request for setting the in-point and the out-point ("Yes" at Step S120), using an in-point setting unit 72 and an out-point setting unit 73, the in-point is set on the video data at the temporary in-point when the request for setting the in-point and the out-point is made (122a), and the out-point is set on the video data at the temporary out-point, and then the in-point and the out-point are stored in the memory 28. It should be noted that the request for setting the in-point and the out-point is made, for example, by an input operation of command buttons shown in the screen by touching the "HIGHLIGHT" 91b (shown in FIG. 5) in the screen displayed in the sub-monitor of the editing controller (see (B) in FIG. 9).

It should be noted that the request for setting the in-point and the out-point may be made after the operator stops the reverse playback. As the reverse playback is stopped, it is possible to set the position of the temporary in-point, and consequently, the in-point may be set more accurately.

Next, the CPU 26 generates the clip 84 based on the setting of the in-point and the out-point (S124). In this way, the temporary clip is decided as the clip. Here, in the same manner as in S118 in FIG. 6, the CPU 26 associates the setting data of the in-point and the out-point with the video data 80, thereby generating the clip 84 as a clip of the video data 84 that is a section between the in-point and the out-point of the video data 80 (see (C) in FIG. 9).

While the video data 84 may be subsequently played as replay for broadcasting referring to (D) in FIG. 9, this is not essential to the third embodiment.

According to the third embodiment, the in-point and the out-point are set by a single operation, for example, pressing a key once, thus allowing quick operation in comparison with the conventionally performed operation of requesting setting the in-point and the out-point.

Moreover, according to the third embodiment, it is possible to set the in-point and the out-point during reverse playback. This allows quick and reliable determination of the clip of the scene to be replayed, and thereby broadcasting in a timely manner.

As a modified example of the third embodiment, it is also possible to further perform, after S124, the preview playback as well as Steps S108 to S118 shown in FIG. 6 of the first embodiment, thereby generating a clip of a different section. In this way, two clips having substantially the same content but with different time durations, for example, may be generated.

Moreover, as another modified example in combination with the second embodiment, it is possible to allow resetting of the in-point while replaying the clip 84, in the same manner as the second embodiment, after S122a and S122b in FIG. 8, that is, after setting the in-point and the out-point. With this, greater flexibility in setting the in-point CAN be provided.

Fourth Embodiment

A fourth embodiment of the present invention is a modification of the first embodiment.

Figure 10:
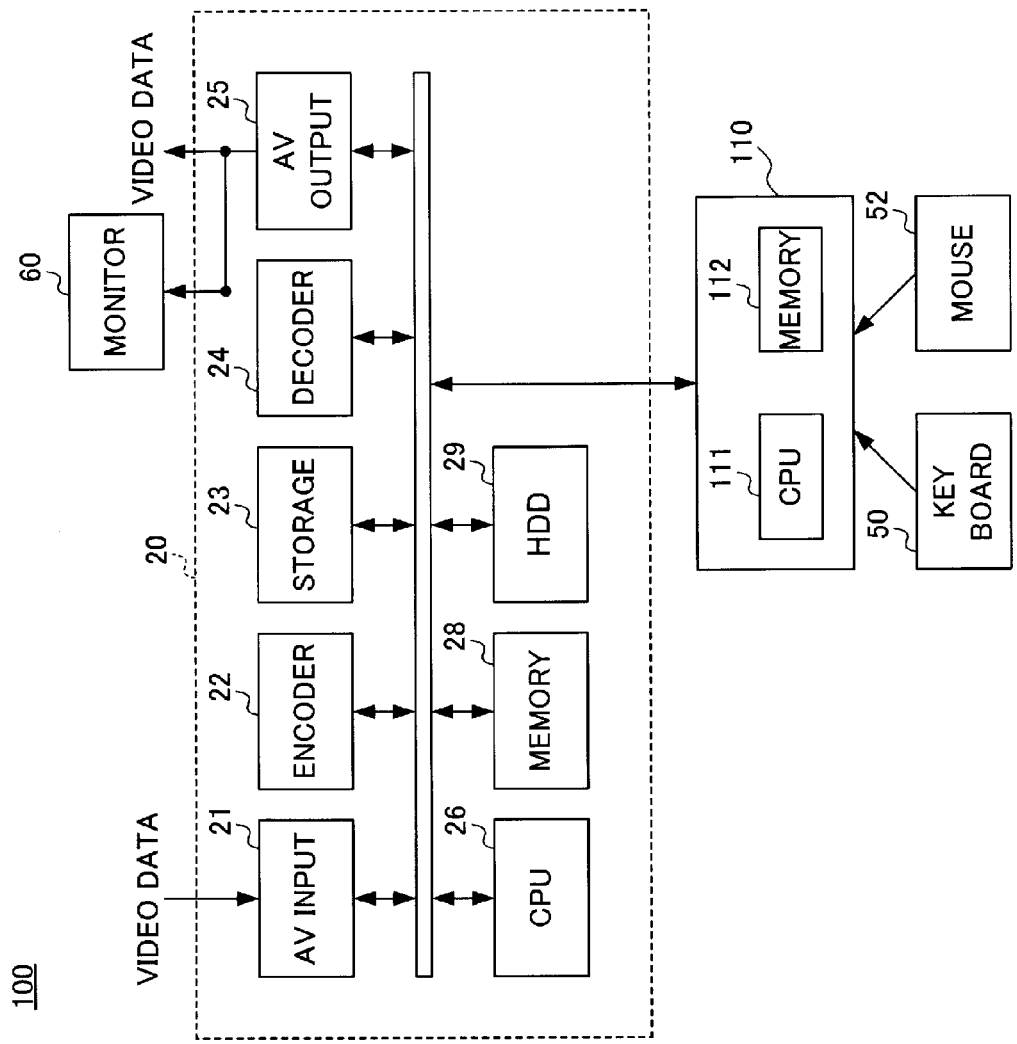
FIG. 10 is a block diagram illustrating a configuration of a fourth embodiment of an editing apparatus according to the present invention.

FIG. 10 is a block diagram illustrating a configuration of the fourth embodiment of an editing apparatus according to the present invention. In the drawing, components corresponding to that described earlier are indicated by the same reference numerals, and the descriptions for these components are omitted.

Referring to FIG. 10, the editing apparatus 100 according to the fourth embodiment of the present invention is configured in the same manner as the editing apparatus 10 according to the first embodiment shown in FIG. 2, other than that an editing apparatus main body 20 is provided with a CPU 26 and a memory 28, and an editing controller 110 is provided with a CPU 111 and a memory 112.

The editing controller 110 is provided with the CPU 111 and the memory 112. The CPU 111 controls the editing controller 110 in cooperation with a program stored in the memory 112. That is, the CPU 111 realizes all the functions realized by the CPU 26 as previously shown in FIG. 4. The CPU 111 makes the editing controller 110 communicate with the editing apparatus main body 20, and executes an editing method as previously described in FIGS. 6 and 7.

The editing controller 110 is provided with input means of the same sort as the editing controller 40 shown in FIG. 3, such as a jog dial or the like. The CPU 111 accepts a request from the input means, and transmits a control command to the CPU 26 of the editing apparatus main body 20 for controlling the components of the editing apparatus main body 20. Moreover, the CPU 111 manages data such as the in-point and the out-point set for the video data, and stores the data in the memory 112.

Further, by connecting the editing controller 110 to the editing apparatus main body 20 over a local area network (LAN), it is possible to reduce the load of the CPU 26 and the memory 28 of the editing apparatus main body 20. Further, by providing wireless transceivers respectively for both the controller 110 and the editing apparatus main body 20, the control command, the data and the like may be exchanged via wireless communication. In this way, the editing controller 110 and the editing apparatus main body 20 may be separated; from each other without restriction due to a cable.

It should be appreciated that the fourth embodiment provides all the advantages of the first to third embodiments.

Preferred embodiments of the present invention have been described above, but the present invention is not limited to a specific embodiment, and various modifications and alterations are possible within the scope of the present invention as described in the claims.

For example, in place of the editing controller 40 shown in FIG. 3, a device having only a jog dial or a device having only keys may be used. On the other hand, functions of the editing controller 40 may be provided in the keyboard 50 or the mouse 52. Further, the functions of the editing controller 40 may be carried out by a graphical user interface (GUI) displayed on the monitor 60, and the keyboard 50 or the mouse 52.

The invention claimed is:

1. An editing apparatus, comprising:
playback means for playing back video data and for playing back video data in reverse;
first setting means for setting a temporary out-point, in response to a request for reverse playback of video data at a position on the video data when the request was made;
accepting means for accepting a request to stop reverse playback of the video data and a request to start playback of the video data;
second setting means for setting temporary in-point, in response to a request to start playback of the video data, at a position in the video data that is being played when the request is made, wherein the temporary in-point is automatically set to a position in the video data when the playback request is made;
temporary clip generating means for generating a temporary clip of the video data of a section between the temporary out-point and the temporary in-point, wherein the temporary in-point of the temporary clip is updated as the video data is played back in reverse;
resetting means for resetting the temporary in-point set by the second setting means in response to a request to reset the in-point during playback of the video data, wherein the in-point is reset at a position in the video data when the request is received;
third setting means for setting an out-point, in response to a request to finish playback of the video data, at a position in the video data that is being played when the request is made; and
generating means for generating other video data from the video data of a section between the reset in-point and the out-point.

2. The editing apparatus according to claim 1, wherein the playback of the video data by the playback means includes variable speed playback and pausing of the playback.

3. The editing apparatus according to claim 1, wherein the temporary in-point is updated as the video data is played in reverse.

4. An editing method comprising the steps of:
switching to a preview playback mode;
forward playing the video data for preview playback of the video data;
setting a temporary out-point and a temporary in-point, in response to a request for reverse playback of video data, at a position on the video data when the request was made;
generating a temporary clip of the video data of a section between the temporary out-point and the temporary in-point;
reverse-playing, in response to the request for reverse playback, the video data, wherein the temporary in-point of the temporary clip is updated as the video data is played back in reverse; and
in response to a request to stop reverse playback, determining a replay starting position;
switching to a transmission playback mode;
setting automatically in response to a request to start playback of video data, an in-point at a position in the video data at which the playback starts, the temporary in-point is updated during reverse playback;
playing back, in response to the request to start playback, the video data;
setting, in response to a request to finish playback of the video data, an out-point at a position on the video data that is being replayed when the request is made; and
generating other video data from the video data of a section between the reset in-point and the out-point.

5. The editing method according to claim 4, wherein the playback of the video data in the step of playing back the video data includes variable speed playback and pausing of the playback.

6. The editing method according to claim 4, wherein generating the temporary clip of the video data includes generating a clip from the video data of a section between the temporary out-point and the temporary in-point.

7. The editing method of claim 4, further comprising:
resetting the in-point, in response to a reset request, during the playing back of the video data at a position of the video data when the reset request is received.

8. An editing method, comprising the steps of:
switching to a preview playback mode;
forward playing video data for preview playback of the video data;
setting, in response to a request for reverse playback, a first reference point and a second reference point at a position on the video data that is being played when the request has been made;
generating a temporary clip of the video data of a section between the first reference point and the second reference point;
reverse playing, in response to the request for reverse playback, the video data, wherein a position of the second reference point is updated during reverse playback;
setting automatically, in response to a request for setting a third reference point, a third reference point at the second reference point at a time when the request for setting an in-point is made;
resetting the first reference point, in response to a reset request, during the playing back of the video data at a position of the video data when the reset request is received; and
generating other video data from the video data of a section between the reset second reference point and the third reference point.

9. A non-transitory computer readable medium comprising an editing program executable by a computer to carry out the steps of:
switching to a preview playback mode;
forward playing the video data for preview playback of the video data;
setting a temporary out-point and a temporary in-point, in response to a request for reverse playback of video data, at a position on the video data when the request was made;
generating a temporary clip of the video data of a section between the temporary out-point and the temporary in-point;
reverse-playing, in response to the request for reverse playback, the video data and updating the position of the temporary in-point of the temporary clip during reverse playback;
in response to a request to stop reverse playback, determining a replay starting position;
switching to a transmission playback mode;

setting automatically, in response to a request to start playback of video data, an in-point at a position in the video data at which the playback starts, wherein the in-point may be reset with a reset request during the playback;

playing back, in response to the request to start playback, the video data;

resetting the in-point, in response to a reset request, during the playing back of the video data at a position of the video data when the reset request is received;

setting, in response to a request to finish playback of the video data, an out-point at a position on the video data that is being replayed when the request is made; and generating other video data from the video data of a section between the reset in-point and the out-point.

10. A non-transitory computer readable medium comprising an editing program executable by a computer to carry out the steps of:

switching to a preview playback mode;

forward playing video data for preview playback of the video data;

setting, in response to a request for reverse playback, a first reference point at a position on the video data that is being played when the request has been made, and further wherein the second setting means resets the in-point during a preview playback in response to a resetting request;

generating a temporary clip of the video data including a temporary in-point and a temporary out-point;

reverse playing, in response to the request for reverse playback, the video data and updating the position of the temporary in-point of the temporary clip during reverse playback;

setting a temporary in-point to accompany the video data that is undergoing playback;

setting automatically, in response to a request for setting a second reference point, a second reference point at the temporary in-point at a time when the request for setting the in-point is made;

resetting the second reference point, in response to a reset request, during the playing back of the video data at a position of the video data when the reset request is received; and generating other video data from the video data of a section between the second reference point and the first reference point.

* * * * *